(12) United States Patent
Forster et al.

(10) Patent No.: US 11,809,938 B2
(45) Date of Patent: Nov. 7, 2023

(54) SELECTIVE THERMAL INSULATION IN MANUFACTURE OF ANTENNAS FOR RFID DEVICES

(71) Applicant: Avery Dennison Retail Information Services LLC, Mentor, OH (US)

(72) Inventors: Ian Forster, Chelmsford (GB); Edward McGinniss, Clinton, SC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 211 days.

(21) Appl. No.: 17/601,733

(22) PCT Filed: Apr. 10, 2020

(86) PCT No.: PCT/US2020/027594
§ 371 (c)(1),
(2) Date: Oct. 6, 2021

(87) PCT Pub. No.: WO2020/210576
PCT Pub. Date: Oct. 15, 2020

(65) Prior Publication Data
US 2022/0164625 A1    May 26, 2022

Related U.S. Application Data

(60) Provisional application No. 62/833,295, filed on Apr. 12, 2019.

(51) Int. Cl.
*G06K 19/077* (2006.01)
*H01Q 1/38* (2006.01)
*H01Q 1/52* (2006.01)

(52) U.S. Cl.
CPC ......... *G06K 19/07773* (2013.01); *H01Q 1/38* (2013.01); *H01Q 1/521* (2013.01)

(58) Field of Classification Search
CPC .... G06K 19/07773; H01Q 1/38; H01Q 1/521; H01Q 1/2225
See application file for complete search history.

(56) References Cited

U.S. PATENT DOCUMENTS

2007/0234553 A1* 10/2007 Cote .................... H01Q 1/2225
343/786

FOREIGN PATENT DOCUMENTS

| EP | 3432224 | 1/2019 |
| JP | 2009-157428 | 7/2009 |
| WO | 2014/093806 | 6/2014 |

OTHER PUBLICATIONS

International Preliminary Report on Patentability dated Sep. 28, 2021 issued in corresponding IA No. PCT/US2020/027594 filed Apr. 10, 2020.

(Continued)

*Primary Examiner* — Sonji N Johnson

(57) ABSTRACT

The antenna of an RFID device is formed by applying an adhesive to a substrate. A conductor is secured to the substrate using the adhesive and then a gap is defined in the conductor in the shape of an antenna so as to isolate an inner region of the conductor from an outer region of the conductor. Heat is applied to the outer region of the conductor so as to cause at least a portion of the adhesive positioned between the outer region of the conductor and the substrate to undergo a phase change or be activated without causing at least a portion of the adhesive positioned between the inner region of the conductor and the substrate to undergo a phase change or be activated. The outer region of the conductor is then dissociated from the substrate, with the inner region of the conductor remaining secured to the substrate by the adhesive as an antenna.

20 Claims, 2 Drawing Sheets

(56) References Cited

OTHER PUBLICATIONS

International Search Report and Witten Opinion dated Jul. 3, 2020 issued in corresponding IA No. PCT/US2020/027594 filed Apr. 10, 2020.

* cited by examiner

SELECTIVE THERMAL INSULATION IN MANUFACTURE OF ANTENNAS FOR RFID DEVICES

CROSS-REFERENCE TO RELATED APPLICATION(S)

The present application is a 371 of International Application No. PCT/US2020/027594, which was published in English on Oct. 15, 2020, and claims the benefit of U.S. Provisional Patent Application No. 62/833,295 filed Apr. 12, 2019, both of which are incorporated herein by reference in their entireties.

FIELD

The present subject matter relates to the manufacture of antennas for radio frequency identification ("RFID") devices. More particularly, the present subject matter relates to the use of selective thermal isolation in the manufacture of antennas for RFID devices.

BACKGROUND

RFID tags and labels (collectively referred to herein as "devices") are used to associate an object with an identification code. RFID devices generally have a combination of antennas and analog and/or digital electronics, which may include, for example, communications electronics, data memory, and control logic. For example, RFID tags are used in conjunction with security locks in cars, for access control to buildings, and for tracking inventory and parcels.

The antenna of an RFID device may be formed by printing an adhesive on a substrate in a pattern that corresponds to the desired shape of the antenna. A foil is laminated onto the substrate and adheres to the adhesive. The foil is then cut along the perimeter of the adhesive, with the portion of the foil not secured to the adhesive being stripped off or otherwise removed and the remaining portion of the foil being retained on the substrate as an antenna. One difficulty associated with so forming an antenna is that care must be taken to ensure proper registration when cutting the foil, which may be difficult due to the complex shapes in which an antenna may be formed. If the adhesive and the cutting mechanism are not properly aligned, portions of the foil intended to define portions of the antenna may become detached from the substrate, resulting in a defective or inoperable antenna.

There exists a need for improved methods of manufacture of RFID antennas that overcome or minimize the limitations discussed above and which are economically and commercially feasible.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

Methods for manufacturing antennas for RFID devices are described herein. In some embodiments, the method includes applying an adhesive to a substrate and securing a conductor, such as a foil or self-supporting coated conductor based on graphene or other organic conductive material(s), to the adhesive. The conductor is typically in the shape of an antenna. A gap is defined in the conductor (which can be in the shape of an antenna) so as to isolate an inner region of the conductor from an outer region of the conductor. In some embodiments, heat is applied to the outer region of the conductor so as to cause at least a portion of the adhesive positioned between the outer region of the conductor and the substrate to melt (or other phase or state change) without causing at least a portion of the adhesive positioned between the inner region of the conductor and the substrate to melt (or other phase or state change) due to the presence of the gap. In some embodiments, the melting of the adhesive causes the outer region of the conductor to dissociate from the substrate, with the inner region of the conductor remaining secured to the substrate by the adhesive as an antenna.

In other embodiments, the method is as described above and the heat is applied at or adjacent to an outer perimeter of the conductor so as to cause at least a portion of the adhesive positioned between the outer region of the conductor and the substrate to melt (or other phase or state change) without causing at least a portion of the adhesive positioned between the inner region of the conductor and the substrate to melt (or other phase or state change).

In still other embodiments, the method is as described above and the heat is applied to the outer region of the conductor by applying an electrical current to the outer region of the conductor so as to cause at least a portion of the adhesive positioned between the outer region of the conductor and the substrate to melt (or other phase or state change) without causing at least a portion of the adhesive positioned between the inner region of the conductor and the substrate to melt (or other phase or state change). In some embodiments, including the embodiments above, the inner region of the conductor is positioned between locations at which a pair of electrodes contacts the outer region of the conductor.

In other embodiments, including the embodiments above, the application of heat to the outer region of the conductor includes contacting the outer region of conductor with at least one heated roller configured to contact the outer region of the conductor at or adjacent to opposing edges of an outer perimeter of the conductor.

In still other embodiments, including the embodiments above, heat is applied to the conductor by induction heating, infrared light, or by an exothermic chemical process.

In some embodiments, the application of heat results in a phase or state change (other than melting) to effect the selective release of the foil and adhesive from the substrate or the foil from the adhesive, for example, by curing. The base layer or foil may be coated with an adhesion promoter or other chemical or material to control or dictate release from the substrate or the adhesive.

In some embodiments, the method is as described above and further includes providing a second gap in the conductor configured to modify the flow of heat through the conductor so as to prevent a portion of the adhesive positioned adjacent to the second gap from melting (or other phase or state change) upon heat being applied to the outer region of the conductor.

In other embodiments, the method is as described above but the conductor (e.g., foil) is cooled from the edges, rather than heated, and the gap (e.g., thermal trench) prevents the antenna area from cooling, resulting in the adhesive losing adhesion to the conductor below a certain temperature. Such methods may be advantageous because heating is generally used in the process of assembling an RFID device, and with the correct adhesive, cooling may be used for the release operation or mechanism of the conductor, but later heating cures the adhesive (e.g., crosslinking and/or polymerization) providing tack between the adhesive and the conductor. The loss of tack described above is a known feature of pressure sensitive adhesives at low or lower temperatures.

In some embodiments, the method is as described above, and wherein the heating or cooling operation is applied to bring the adhesive above or below a critical temperature to cause the adhesive to lose tack and detach from the substrate with the conductor (e.g., foil) containing mechanical support to prevent it from breaking during the stripping option.

In some embodiments, including the embodiments above, a system for manufacturing an antenna of an RFID device. In some embodiments, the system includes, but is not limited to, (1) an adhesive application station configured to apply an adhesive to a substrate; (2) a lamination station configured to secure a conductor to the adhesive; (3) an isolation station configured to define a gap in the conductor in the shape of an antenna so as to isolate an inner region of the conductor from an outer region of the conductor; (4) a heating station configured to apply heat to the outer region of the conductor so as to cause at least a portion of the adhesive positioned between the outer region of the conductor and the substrate to melt (or other phase or state change) or be activated without causing at least a portion of the adhesive positioned between the inner region of the conductor and the substrate to (or other phase or state change) or be activated; and (5) a stripping station of the configured to dissociate the outer region of the conductor from the substrate, with the inner region of the conductor remaining secured to the substrate by the adhesive as an antenna.

In some embodiments, the method is as described above and the substrate is or contains a web of material, and at least one roller is provided that is configured to contact the conductor and advance the web of material from one of the stations to another one of the stations. In some embodiments, the at least one roller is a pair of rollers incorporated into the heating station and configured to apply heat to the outer region of the conductor by contacting the outer region of the conductor and applying an electrical current to the outer region of the conductor.

DETAILED DESCRIPTION

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 7:
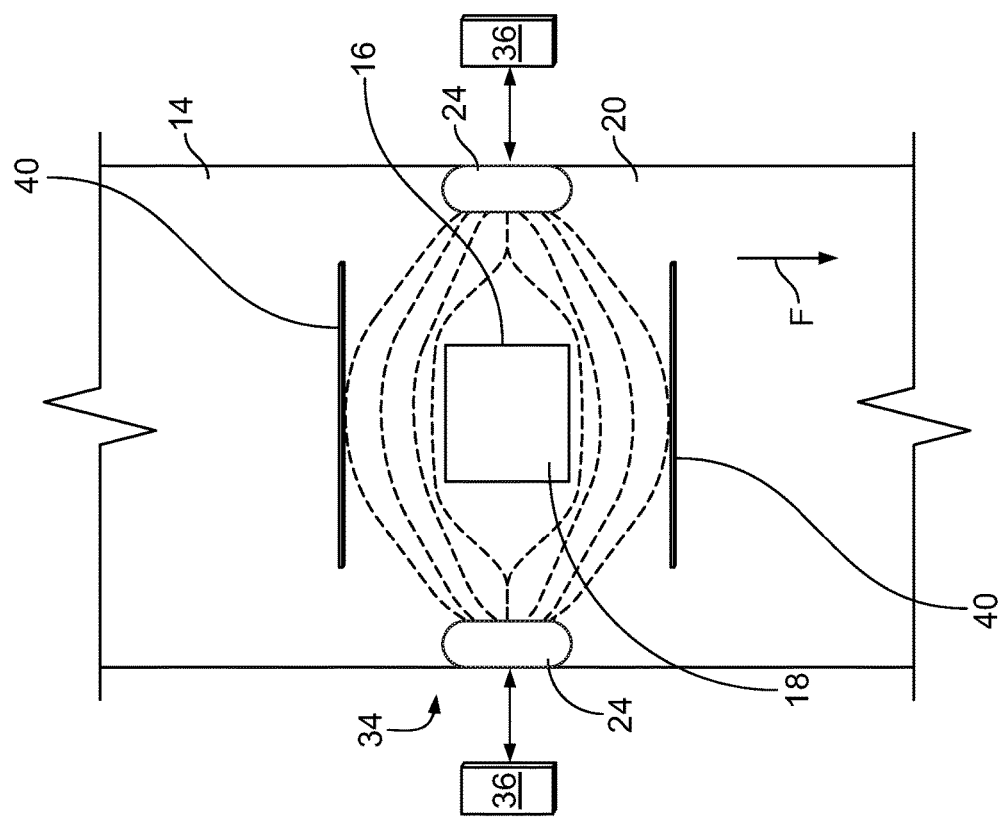
FIG. 7 is a top plan view of a heating station of another embodiment of a system suitable for manufacturing antennas according to the present disclosure.

FIGS. 1-5 illustrate a procedure for manufacturing an antenna of a type that may be incorporated into an RFID device. First, a substrate 10 is provided, as in FIG. 1. The substrate 10 may be variously configured without departing from the scope of the present disclosure. In one exemplary embodiment, the substrate 10 is formed of a paper material. In another embodiment, the substrate 10 is formed of a plastic or polymeric material, such as a polyolefin (e.g., polyethylene, polypropylene, etc., or combinations thereof), a polyester, e.g., polyethylene terephthalate, and combinations thereof. FIGS. 1-5 illustrate the substrate 10 as a discrete piece of material onto which a single antenna is formed, but it should be understood that the substrate 10 may instead be provided as an elongated web or sheet of material onto which a plurality of antennas are formed, as shown in FIGS. 6 and 7 and as will be described in greater detail herein.

Figure 1:
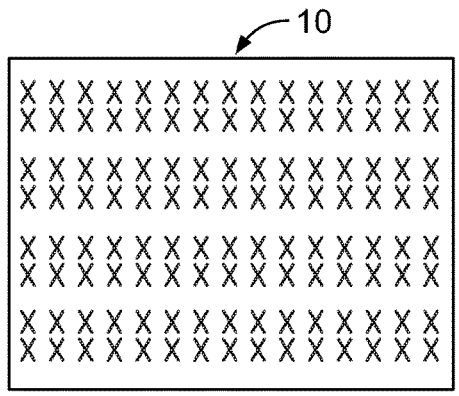
FIG. 1 is a top plan view of a substrate suitable for use in manufacturing an antenna according to the present disclosure.
Figure 2:
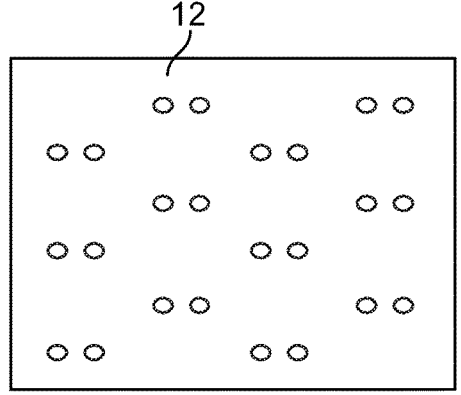
FIG. 2 is a top plan view of the substrate of FIG. 1, with an adhesive applied thereto.

FIG. 2 shows an adhesive 12 applied to a surface of the substrate 10. While FIG. 2 shows the adhesive 12 applied to an entire surface of the substrate 10 (e.g., continuous layer of adhesive), it should be understood that the adhesive 12 may be applied to only a portion of a surface of the substrate 10 (e.g., discontinuous layer). The discontinuous layer can be applied as a pattern, for example, or regular or random pattern. In such a configuration, the adhesive 12 is applied to an area of the substrate 10 encompassing the location in which an antenna is to be formed, with an outer perimeter of the adhesive 12 extending beyond an outer perimeter to be defined by the antenna at all points. In other words, the adhesive 12 defines a boundary within which an antenna will be entirely received. Notably, the outer perimeter or boundary of the adhesive 12 does not coincide with the outer perimeter or boundary of the antenna to be formed and need not be provided in the same shape as the antenna to be formed. Thus, while an antenna to be formed may have a complex shape, the adhesive 12 may be applied in a much simpler shape, which may include the adhesive 12 being applied to an entire surface of the substrate 10, as in FIG. 2. It should be understood that the adhesive 12 may be applied via a process that is simplified compared to the conventional approach, in which an adhesive is applied in a pattern corresponding exactly to the shape of the antenna to be formed.

The nature of the adhesive 12 may vary without departing from the scope of the present disclosure, provided that it is suitable to secure a foil to the substrate 10 and configured to melt (or other phase or state change) at some temperature. Preferably, the melting point/phase change temperature of the adhesive 12 is a temperature that is sufficiently low to avoid damage to the substrate 10 when the adhesive 12 is brought to its melting point (or other phase or state change). In an exemplary embodiment, the adhesive 12 is configured as a hot melt adhesive, but other types of adhesive may also be employed, such as a pressure sensitive adhesive.

Figure 3:
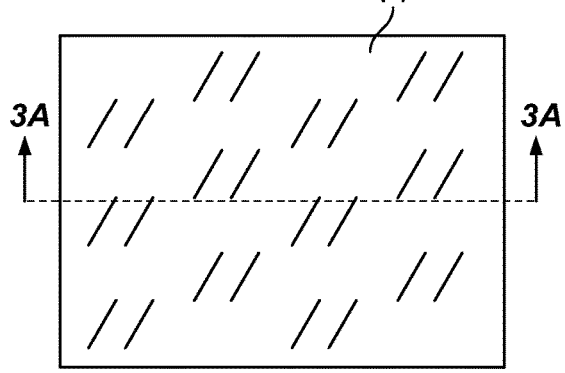
FIG. 3 is a top plan view of the substrate and adhesive of FIG. 2, with a foil secured to the adhesive.
Figure 3A:
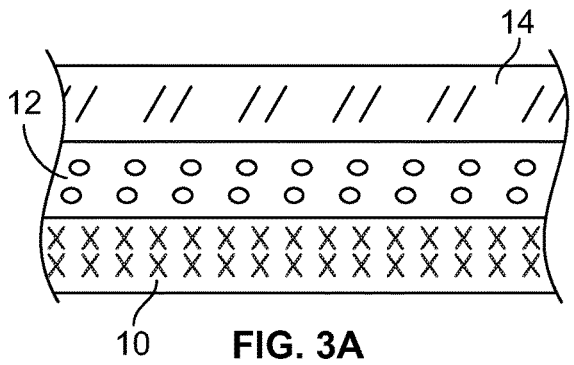
FIG. 3A is a cross-sectional view of the assembly of FIG. 3, taken through the line 3A-3A.

A foil 14 is applied to the adhesive 12 to secure the foil 14 to the substrate 10, as shown in FIGS. 3 and 3A. FIG. 3 shows the foil 14 applied over the entire surface of the adhesive 12, but it should be understood that the outer perimeter or boundary of the foil 14 may be positioned inside or outside of the outer perimeter or boundary of the adhesive 12 at any point. As will be described in greater detail, a portion of the foil 14 will define an antenna, so regardless of the exact size and shape of the foil 14, it should be applied to an area of the adhesive 12 encompassing within the location in which an antenna is to be formed, with an outer perimeter of the foil 14 extending beyond an outer perimeter to be defined by the antenna at all points. In other words, the foil 14 defines a boundary within which an antenna will be formed.

The nature of the foil 14 may vary without departing from the scope of the present disclosure, provided that it is formed of a heat- and electricity-conductive material suitable to serve as an antenna of an RFID device. In an exemplary embodiment, the foil 14 is formed of an aluminum material, but other types of foil may also be employed, such as a foil formed of a different type of metallic material, for example, copper, silver, nickel, or combinations thereof. In other embodiments, the conductor or conducting material can be an organic material, such as a self-supporting coated conductor based on graphene.

Figure 4:
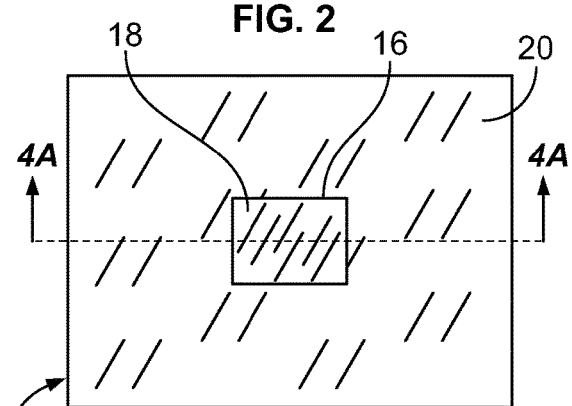
FIG. 4 is a top plan view of the assembly of FIG. 3, with a gap defined in the foil to separate an inner region of the foil from an outer region of the foil.
Figure 4A:
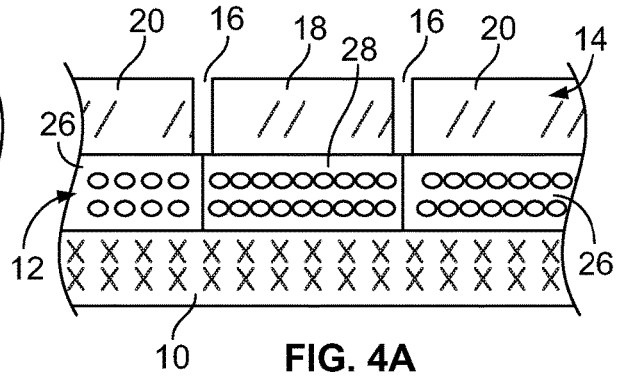
FIG. 4A is a cross-sectional view of the assembly of FIG. 4, taken through the line 4A-4A.

With the foil 14 secured to the substrate 10 via the adhesive 12, a thermal trench or gap 16 is defined in the foil 14, as in FIGS. 4 and 4A. As best shown in FIG. 4A, the gap 16 passes entirely through the thickness of the foil 14 so as to isolate an inner region 18 of the foil 14 from an outer region 20 of the foil 14. While FIG. 4A shows the gap 16 extending only through the foil 14, it should be understood that it may extend through all or a portion of the adhesive 12 as well. Additionally, the gap 16 is shown in FIG. 4 as having a simple shape, but it should be understood that the shape of the gap 16 will coincide with the shape of the antenna, so it may (and typically will) be applied in a more complex shape than what is shown in FIG. 4. The gap 16 may be formed using a laser or any other suitable cutting or forming means, device, or method without departing from the scope of the present disclosure.

By separating the inner region 18 of the foil 14 from the outer region 20 of the foil 14, the inner region 18 will not only be physically isolated from the outer region 20, but will also be electrically and thermally isolated from the outer region 20 (which is why the gap 16 may be referred to as a thermal trench). Thus, heat applied to the outer region 20 of the foil 14 will not be directly transferred to the inner region 18 of the foil 14 from the outer region 20 of the foil 14, due to the presence of the gap 16. Accordingly, in the next step of a manufacturing process, heat is applied to the outer region 20 of the foil 14. The heat may be applied according to any suitable approach, such as those discussed above. In one embodiment, which is illustrated in FIG. 6, at least one heated object (such as a heated roller 22) is brought into contact with the outer region 20 of the foil 14 to increase the temperature of the outer region 20 of the foil 14. In another embodiment, which is illustrated in FIG. 7, an electrical current is applied to the outer region 20 of the foil 14 by a pair of electrodes 24 (which are illustrated in FIG. 7 as contact rollers) brought into contact with the outer region 20 of the foil 14. Passing an electrical current through the outer region 20 of the foil 14 will increase its temperature, as will any of a number of other suitable approaches to heating the outer region 20 of the foil 14, such as the use of induction heating or an exothermic chemical process or the application of infrared light to the outer region 20 of the foil 14, for example.

It may be advantageous for heat to be applied at a location or locations spaced distally from the inner region 18 of the foil 14, rather than adjacent to the inner region 18 of the foil 14 in order to minimize any incidental increase in the temperature of the inner region 18 of the foil 14. For example, FIGS. 6 and 7 show heat (either direct heat or heat arising from the application of an electrical current) being applied at or adjacent to opposing edges of an outer perimeter of the foil 14, with the inner region 18 of the foil 14 positioned between two points of application of heat. However, it should be understood that heat may be applied the outer region 20 of the foil 14 in any one or more locations without departing from the scope of the present disclosure.

Regardless of the particular manner in which heat is applied, the outer region 20 of the foil 14 is heated to a sufficient temperature so as to cause at least a portion of the adhesive 12 positioned between the outer region 20 of the foil 14 and the substrate 10 (identified in FIG. 4A at 26) to melt (or other phase or state change). Due to the presence of the gap 16, the temperature of the outer region 20 of the foil 14 is not directly transferred to the inner region 18 of the foil 14 and, hence, to the portion of the adhesive 12 positioned between the inner region 18 of the foil 14 and the substrate 10 (identified in FIG. 4A at 28), from the outer region 20 of the foil 14. Heat applied to the outer region 20 of the foil 14 may be transmitted to the inner region 18 of the foil 14 and to the portion 28 of the adhesive 12 positioned between the inner region 18 of the foil 14 and the substrate 10 (e.g., from the outer region 20 of the foil 14, to the portion 26 of the adhesive 12 positioned between the outer region 20 of the foil 14 and the substrate 10, to the substrate 10, to the portion 28 of the adhesive 12 positioned between the inner region 18 of the foil 14 and the substrate 10, and to the inner region 18 of the foil 14), but heat will be transferred much less efficiently via such an alternative, indirect path. For example, the thermal conductivity of aluminum (which may be used to form the foil 14) may be on the order of 4,100 times greater than the thermal conductivity of paper (which may be used to form the substrate 10). Accordingly, the application of heat for a time sufficient to cause the portion 26 of the adhesive 12 positioned between the outer region 20 of the foil 14 and the substrate 10 to melt (or other phase or state change) will not cause at least a portion of the adhesive 12 positioned between the inner region 18 of the foil 14 and the substrate 10 (and, more preferably, any of such portion 28 of the adhesive 12) to melt (or other phase or state change) or be activated.

Figure 5:
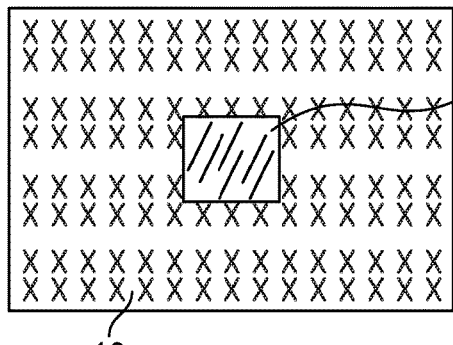
FIG. 5 is a top plan view of the assembly of FIG. 4, with the outer region of the foil removed and with the inner region of the foil remaining as an antenna.
Figure 6:
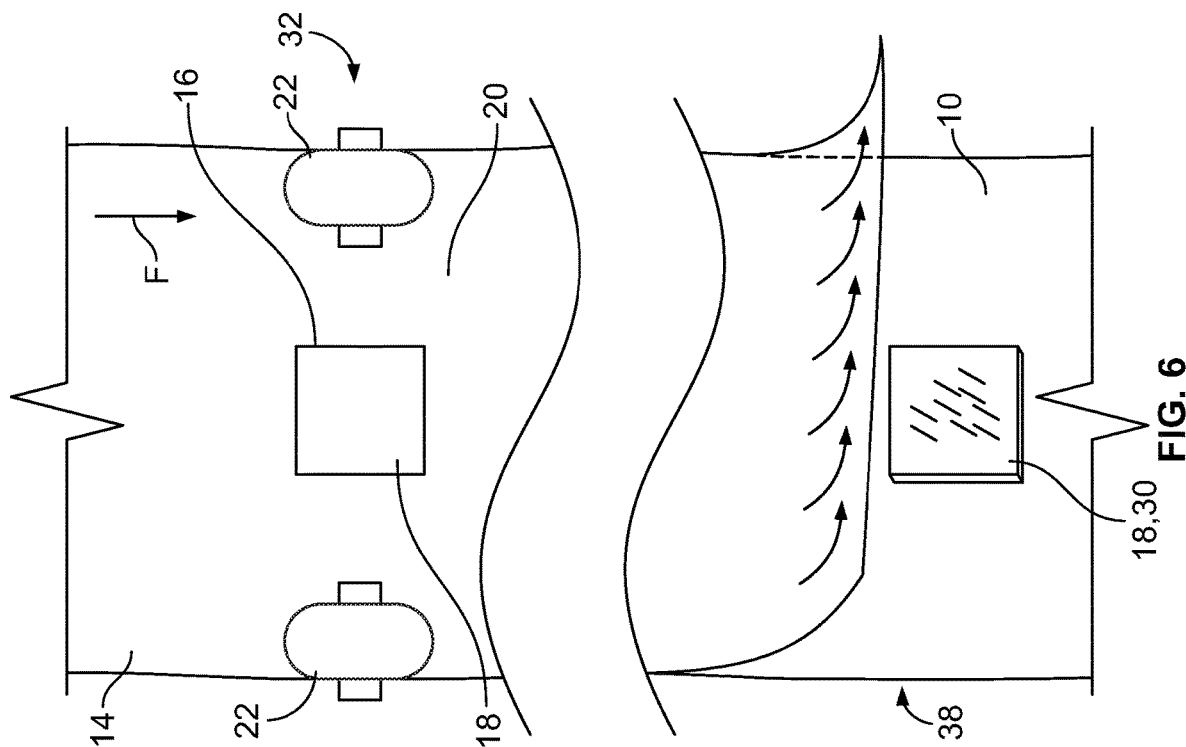
FIG. 6 is a top plan view of heating and stripping stations of one embodiment of a system suitable for manufacturing antennas according to the present disclosure.

With the portion 26 of the adhesive 12 positioned between the outer region 20 of the foil 14 and the substrate 10 having reached its melting point (or other phase or state change point), it will melt (or other phase or state change), allowing the outer region 20 of the foil 14 to be dissociated from the substrate 10 by any suitable approach, as shown in FIG. 5. The portion 28 of the adhesive 12 positioned between the inner region 18 of the foil 14 and the substrate 10 will remain below its melting point (or other phase or state change point) or activation temperature, thus continuing to secure the inner region 18 of the foil 14 to the substrate 10. Following removal of the outer region 20 of the foil 14, only the inner region 18 of the foil 14 will remain secured to the substrate 10 as an antenna 30, which may be incorporated into an RFID device (e.g., by electrically coupling an RFID chip to the antenna 30, as is well-known in the art). Thus, it should be understood that the antenna 30 has been formed by precisely defining the gap 16 in the shape of the antenna 30, which avoids various disadvantages of the conventional approach to forming an antenna (namely, applying adhesive in a precise pattern and then cutting foil exactly along the outer perimeter of the patterned adhesive, taking care that there is proper registration between the adhesive and the applied cut).

As discussed above, in some embodiments, the adhesive is a hot-melt adhesive. However, in other embodiments, the adhesive is one which undergoes a phase or state change when heat or cooling is applied. For example, in some embodiments, cooling may be used for the release operation or mechanism of the conductor, but later heating cures the adhesive providing tack between the adhesive and the conductor. The loss of tack described above is a known feature of pressure sensitive adhesives at low or lower temperatures.

In other embodiments, the conductor (e.g., foil) is cooled from the edges, rather than heated, and the gap (e.g., thermal trench) prevents the antenna area from cooling, and resulting in the adhesive losing adhesion to the conductor below a certain temperature. Such methods may be advantageous because heating is generally used in the process of assembling an RFID device, and with the correct adhesive, cooling may be used for the release operation or mechanism of the conductor, but later heating cures the adhesive (e.g., cross-linking and/or polymerization) providing tack between the adhesive and the conductor. The loss of tack described above is a known feature of pressure sensitive adhesives at low or lower temperatures.

The manufacturing process illustrated in FIGS. 1-5 may be executed by one or a plurality of devices or tools. In one embodiment, a single system may be provided for carrying out the various processes required to form an antenna 30 according to the present disclosure. For example, such a system would include an adhesive application station configured to apply an adhesive 12 to a substrate 10 (as in FIG. 2). The system would further include a lamination station configured to secure a foil 14 to the adhesive 12 (as in FIG. 3) and an isolation station configured to define a gap 16 in the foil 14 in the shape of an antenna 30 so as to isolate an inner region 18 of the foil 14 from an outer region 20 of the foil 14 (as in FIG. 4).

The system would additionally include a heating station configured to apply heat to the outer region 20 of the foil 14 so as to cause at least a portion of the adhesive 12 positioned between the outer region 20 of the foil 14 and the substrate 10 to melt (or other phase or state change) or be activated without causing at least a portion of the adhesive 12 positioned between the inner region 18 of the foil 14 and the substrate 10 to melt (or other phase or state change) or be activated. Exemplary heating stations 32 and 34 are shown in FIGS. 6 and 7, with FIG. 6 showing a heating station 32 in which at least one heated object (illustrated as a pair of heated rollers 22) is brought into contact with the outer region 20 of the foil 14 and with FIG. 7 showing a heating station 34 in which electrodes (illustrated as a pair of contact rollers 24 connected to a source of electrical current 36) are brought into contact with the outer region 20 of the foil 14 to heat the outer region 20 of the foil 14 via application of an electrical current.

The system would also include a stripping station configured to dissociate the outer region 20 of the foil 14 from the substrate 10, with the inner region 18 of the foil 14 remaining secured to the substrate 10 by the adhesive 12 as an antenna 30 (as in FIG. 5). FIG. 6 shows an exemplary stripping station 38 in which the outer region 20 of the foil 14 is pulled away from the substrate 10 to dissociate the outer region 20 of the foil 14 from the substrate 10, leaving the inner region 18 of the foil 14 as an antenna 30. It should be understood that the individual stations of such a system may be variously configured and that such a system may include additional stations (e.g., stations in which an RFID chip is electrically coupled to the antenna 30 to complete assembly of an RFID device, the assembled RFID device is tested, and the RFID chip is programmed).

In some embodiments, the method is as described above, and wherein the heating or cooling operation is applied to bring the adhesive above or below a critical temperature to cause the adhesive to lose tack and detach from the substrate with the conductor (e.g., foil) containing mechanical support to prevent it from breaking during the stripping option.

As described above, while FIGS. 1-5 illustrate the substrate 10 and the foil 14 as discrete pieces of material onto which a single antenna is formed, the substrate 10 and the foil 14 may be provided as elongated webs or sheets of material onto which a plurality of antennas are formed, as shown in FIGS. 6 and 7. Such a configuration may be particularly advantageous for a single system configured to assemble the various components of the antenna assembly and execute all of the necessary processing steps, as the substrate 10 and the foil 14 may be drawn into the appropriate stations of the system from rolls of material, allowing for continuous, sequential processing of a plurality of antennas. Mechanisms for conveying the webs of material through the system (e.g., a conveyor belt or the rollers 22 and 24 of FIGS. 6 and 7) move the webs from one station to the next (in a direction of flow as generally indicated in FIGS. 6 and 7 at "F"), optionally with one or more of the conveyance mechanisms applying heat to the outer region 20 of the foil 14 in the heating station 32, 34 (as is the case with the rollers 22 and 24 of FIGS. 6 and 7). In such a system, an additional station may be included to separate one antenna from the next antenna, such as by cutting the webs of material at an appropriate stage of manufacture.

It should be understood that the principles described herein are not limited to gaps formed so as to define an antenna, but may be more generally applied during the manufacture of an antenna for an RFID device. For example, FIG. 7 illustrates the possibility of defining at least one additional gap or thermal trench (shown in FIG. 7 as two secondary gaps 40) that may be spaced from the antenna-defining gap 16 and variously configured without departing from the scope of the present disclosure. As is the case with the antenna-defining gap 16, a secondary gap 40 will modify the flow of heat and electricity through the foil 14, which may include preventing a portion of the adhesive 12 positioned adjacent to the secondary gap 40 from melting (or other phase or state change) or be activated upon heat being applied to the outer region 20 of the foil 14. FIG. 7 shows a pair of secondary gaps 40 in the shape of straight lines applied to opposite sides of the antenna-defining gap 16, but it should be understood that a secondary gap may be variously configured and positioned without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A method of manufacturing an antenna of an RFID device, comprising:
   applying an adhesive to a substrate;
   securing a conductor to the adhesive;
   defining a gap in the conductor in the shape of an antenna so as to isolate an inner region of the conductor from an outer region of the conductor;
   applying heat or cold to the outer region of the conductor so as to cause at least a portion of the adhesive positioned between the outer region of the conductor and the substrate to have a phase change without causing at least a portion of the adhesive positioned between the inner region of the conductor and the substrate to have a phase change; and
   dissociating the outer region of the conductor from the substrate, with the inner region of the conductor remaining secured to the substrate by the adhesive as an antenna.

2. The method of claim 1, wherein said applying heat to the outer region of the conductor includes applying heat at or adjacent to an outer perimeter of the conductor.

3. The method of claim 1, wherein said applying heat to the outer region of the conductor includes applying an electrical current to the outer region of the conductor.

4. The method of claim 3, wherein the electrical current is applied to the outer region of the conductor by a pair of electrodes contacting the outer region of the conductor.

5. The method of claim 1, wherein the inner region of the conductor is positioned between locations at which the pair of electrodes contacts the outer region of the conductor.

6. The method of claim 5, wherein the electrodes are configured to contact the outer region of the conductor at or adjacent to opposing edges of an outer perimeter of the conductor.

7. The method of claim 1, further comprising defining a second gap in the conductor configured to modify the flow of heat through the conductor so as to prevent a portion of the adhesive positioned adjacent to the second gap from undergoing a phase change upon heat being applied to the outer region of the conductor.

8. The method of claim 1, wherein said applying heat to the outer region of the conductor includes contacting the outer region of conductor with at least one heated roller.

9. The method of claim 8, wherein said applying heat to the outer region of the conductor includes contacting the outer region of conductor with a pair of heated rollers.

10. The method of claim 9, wherein the heated rollers are configured to contact the outer region of the conductor at or adjacent to opposing edges of an outer perimeter of the conductor.

11. The method of claim 1, wherein said applying heat to the outer region of the conductor includes applying heat to the outer region of the conductor by induction heating.

12. The method of claim 1, wherein said applying heat to the outer region of the conductor includes applying heat to the outer region of the conductor using infrared light.

13. The method of claim 1, wherein said applying heat to the outer region of the conductor includes applying heat to the outer region of the conductor using an exothermic chemical process.

14. A system for manufacturing an antenna of an RFID device, comprising:
   an adhesive application station configured to apply an adhesive to a substrate;
   a lamination station configured to secure a conductor to the adhesive;
   an isolation station configured to define a gap in the conductor in the shape of an antenna so as to isolate an inner region of the conductor from an outer region of the conductor;
   a heating station configured to apply heat to the outer region of the conductor so as to cause at least a portion of the adhesive positioned between the outer region of the conductor and the substrate to undergo a phase change without causing at least a portion of the adhesive positioned between the inner region of the conductor and the substrate to undergo a phase change; and
   a stripping station configured to dissociate the outer region of the conductor from the substrate, with the inner region of the conductor remaining secured to the substrate by the adhesive as an antenna.

15. The system of claim 14, wherein the substrate comprises a web of material, and further comprising at least one roller configured to contact the conductor and advance the web of material from one of the stations to another one of the stations.

16. The system of claim 15, wherein the at least one roller is incorporated into the heating station, configured to contact the outer region of the conductor, and heated to apply heat to the outer region of the conductor.

17. The system of claim 16, wherein said at least one roller comprises a pair of heated rollers.

18. The system of claim 17, wherein the heated rollers are configured to contact the outer region of the conductor at or adjacent to opposing edges of an outer perimeter of the conductor.

19. The system of claim 15, where the at least one roller comprises a pair of rollers incorporated into the heating station and configured to apply heat to the outer region of the conductor by contacting the outer region of the conductor and applying an electrical current to the outer region of the conductor.

20. The system of claim 19, wherein the rollers are configured to contact the outer region of the conductor at or adjacent to opposing edges of an outer perimeter of the conductor.

* * * * *